United States Patent Office

3,432,315
Patented Mar. 11, 1969

3,432,315
MONOLITHIC REFRACTORY
George R. Henry, Bethel Park, and Thomas W. Lewis II, Pittsburgh, Pa., assignors to Dresser Industries, Inc., Dallas, Tex., a corporation of Delaware
No Drawing. Filed Nov. 25, 1966, Ser. No. 596,795
U.S. Cl. 106—59       6 Claims
Int. Cl. C04b 35/04

ABSTRACT OF THE DISCLOSURE

A dead burned magnesite castable having a binder comprising a soluble sulfate compound, a soluble borate compound, and finely divided chromic oxide.

Prior art

This invention is an advance in the art of making furnace bottoms and magnesite castables. This is an area in which there have been progressive improvements during the last thirty years which have drastically changed the character of furnace practice. Ordinarily, furnace walls are constructed of brick, but the bottoms in many cases have been of monolithic material supplied in unconsolidated or granular form (usually less than 4 mesh Tyler). With the advent of the basic open hearth steelmaking furnace, the standard practice became that of building up furnace bottoms using dead burned magnesite or dolomite and burning it in layer-by-layer and inch-by-inch.

The foregoing burn-in practice could consume quite a few days, sometimes two or three weeks, and was costly in the terms of furnace availability. A great advance was made about twenty-five years ago when bonding agents or binders (setting initially at room temperature) were combined with dead burned refractory grain so that the entire thickness of the hearth, frequently 18 inches or more, could be applied at one time and steelmaking could be begun within a day or two. That such a step was at all possible was a matter of surprise to refractory technologists because the bonding agent, frequently sodium silicate, introduced water or required additions of water and, hence, exposed the dead burned refractory grain to the possibility of hydration. This was, in fact, not an empty fear since hydration of entire furnace bottoms did occur in several instances causing buckling and heaving and requiring an entire replacement.

With the advent of more hydration-resistant dead burned basic refractory grain, and in particular dead burned magnesite, ramming techniques (which require very little water) were employed to make chemically-basic furnace bottoms. This more hydration-resistant grain served in great part to overcome the buckling and heaving, noted above. It has been realized for some time that ramming is a tedious and time-consuming job, and that the resulting installation is subject to variations in quality because of the frequently unskilled operators who do the ramming. There is no easy way for an inspector of the job to know whether it is being sufficiently rammed. For example, insufficient ramming may consequently produce areas of low density and high porosity which will be far more susceptible to corrosion and attack during furnace operation which influence furnace life.

It has long been realized that a method not subject to these porosity and density variations would be the casting or pouring of suitable dead burned basic hearth material. The casting of refractories into place has a further advantage in that the material can be made to conform to almost any desired shape. Unfortunately, the increase in moisture requirement, from 2 to about 7%, to bring the magnesite grain from ramming to casting consistency, greatly aggrevates the difficulty of protecting from reaction with water even with the more hydration-resistant dead burned magnesite. Another problem that becomes very acute is the tendency for the monolith to explode on heat-up. The exact mechanism that makes these monoliths vulnerable to explosion is not known, but it can be said with some certainty that portions of the structure are sufficiently impervious such that, upon burn-in, steam is generated faster than it can escape. When the steam pressure exceeds the strength of the monoliths then explosion results. If the monolith is weak, the explosion is minor; but if the monolith is strong, the explosion is violent and dangerous. In some cases, special installation steps can be taken to avoid explosion. (See United States Patent 3,233,015.)

In addition to explosion and hydration resistance, basic refractory monoliths should have several other properties. They should be dense and nonporous to physically resist metallurgical slag attack. They should also be sufficiently high in MgO for good refractoriness. Good density can only be obtained by starting with a dense magesite grain. As a general rule, it is much easier to prepare a dense grain if accesory oxides such as iron oxide and lime are added during the preparation of the grain. Unfortunately, these accessory oxides unacceptable lower the refractoriness of a monolith made from such a grain. Ideally, a monolith should be prepared from a grain containing sufficient accessory oxides to allow densification and a bond which in some way reacts with the accessory oxides so that a monolith of good refractoriness results. It should have good strength from room temperature to use temperature.

Over a period of several years, applicants have experimented with literally hundreds of combinations of magnesites and binders in an attempt to develop a basic monolith with the desirable properties outlined above. It was generally found that binders which allowed emplacement with a minimum tempering fluid improved the density but, almost without exception, the dense monoliths exploded. The most commonly used binder has been sodium silicate. It was found to provide a monolith with marginal density and a tendency to explode on heat-up. The oxysulfate and oxychloride bonds formed by the addition of sulfate and chloride salts provided exceptionally good density but were found extremely explosion-prone. Soluble chromates are known to provide good density and, in some cases, are not explosion-prone. However, they are toxic, and for this reason workmen desire not to use them. The phosphate salts were generally found to react too rapidly with magnesite grain to provide acceptable working characteristics, and were found to be generally explasion-prone.

It has been found that silicate and phosphate salt binders, when added to high purity magnesites, provide a mix with lowered refractoriness and slag resistance. The chromate, sulfate, and chloride binders generally do not detrimentally effect refractoriness.

Brief description of the invention

This invention is predicated on the discovery that a magnesite castable with a binder comprising a soluble sulfate compound and a soluble borate compound can be made non-explosion prone by the additions of a small quantity of finely divided chromic oxide.

According to one aspect of this invention, a magnesite castable batch is prepared by combining a dead burned magnesite of at least 90% MgO with 1 to 5% nitre cake or magnesium sulfate, ½ to 2% boric acid or sodium borate, and 1 to 5% finely divided solid particles of chromic oxide. Preferably the binder portion of the batch will be typically 2% nitre cake, 1% chromic oxide, and ½% boric acid. (All percentages are by weight based on the total weight of the batch.) It is desirable that the magnesite be size graded to have the following screen analysis:

| Mesh: | Percent |
|---|---|
| 3 on 28 | 40–60 |
| −65 | At least 35 |
| −325 | At least 25 |

This invention deals particularly with the use of the trivalent oxide of chrome ($Cr_2O_3$) and, in particular, to chromium sesquioxide. In the past, this compound has been used primarily as a pigment and, to some extent, as a metallurgical source of chromium metal. Special grades are also produced in limited amounts for use as a catalyst for certain chemical reactions.

Such $Cr_2O_3$ used according to the concepts of this invention, is a very finely divided powder. The separate and discrete particles of the material average about one micron or less in diameter, and are remarkably uniform in this size range. It crystallizes in the hexagonal system similar to the hematite structure. Such $Cr_2O_3$ material is water insoluble. Widely accepted specifications for such $Cr_2O_3$ are: purity minimum 97%, water soluble impurities maximum 0.5%, volatile impurities maximum 0.5%. Specific gravity is about 5.1 to 5.2.

Detailed description of the invention

Further features and other objects and advantages of this invention will become clear to those skilled in the art by a careful study of the following detailed description. In the detailed description, all sizes are recorded by Tyler screen series; all percentages and parts are by weight; chemical analyses were obtained by spectrographic analysis and controlled by wet chemical analysis and are reported as oxides in accordance with the common practice in the refractories industry.

To illustrate the teachings of this invention, the following mixes were prepared, as shown in Table I. The mixes were tempered with sufficient water to bring them to ramming consistency (about 3%), and pressed at about 3000 p.s.i. which has been found roughly equivalent to ramming. While the primary use of mixes made according to this invention are as castables, they are also very satisfactory as ramming mixes. (From past experience, we know that the physical and refractory properties of refractory monoliths are very similar whether cast or rammed.) The pressed brick were then tested for typical physical properties such as bulk density, cold crushing strength before and after a 2910 reheat, and load-test-to-failure. The results of these tests are given in Table I.

TABLE I

| Examples | 1 | 2 |
|---|---|---|
| High purity magnesite: | | |
| −3½+8 mesh, percent | 37 | 37 |
| −8+28 mesh, percent | 26.5 | 26.5 |
| Ball milled fines (70%−325), percent | 33 | 34 |
| Chromic oxide ($Cr_2O_3$) | 1 | |
| Nitre cake | 2 | 2 |
| Boric acid | 0.5 | 0.5 |
| Bulk density, dry, p.c.f. (avg. 14) | 173 | 171 |
| Cold Crushing Strength, p.s.i.: | | |
| At room temp. (avg. 3) | 7,350 | 5,850 |
| After 2,910° F. reheat (avg. 3) | 5,120 | 2,290 |
| Load test, 25 p.s.i. (avg. 2) temperature of failure (° F.) | 2,470 | 2,345 |

Table I establishes that the chromic oxide addition to the nitre cake-boric acid binder results in increased bulk density, strength after drying and after heating to 2910° F. It also results in a considerable increase in refractoriness as shown by the load-test-to-failure.

Mixes 3 and 4 (shown in Table II) were batched identically to mixes 1 and 2 respectively. However, they were tempered with about 6% water and vibration cast. They were cast into 9 x 18 x 12″ blocks. The blocks were allowed to stand with one face exposed to the atmosphere for about 3 days. Thereafter, the blocks were tested by placing the exposed face in the door of a test furnace where the temperature could be raised to 2000° F. in about 30 minutes. This is considered by us to be a very severe test for determining the tendency of refractory monoliths to explode on heat-up. Mix 4 exploded violently. This was expected because in our prior work we have always found the sulfate bonds to be extremely explosion prone, and especially if the boric acid was eliminated from the mix. No explosion occurred when mix 3 was tested. This was considered indeed surprising. It has been our experience that whenever refractory monoliths approach 180 p.c.f. in density, they would surely explode with, perhaps, the exception of those bonded with soluble chromates. Portions of the test blocks were measured and weighed to determine bulk density. Example 3 was found to have a bulk density of 177 p.c.f. Example 3 is the best mode now known to us for practicing our invention.

TABLE II

| Examples | 3 | 4 |
|---|---|---|
| Explosion test-cast block: | | |
| Bulk density, p.c.f. | 177 | 170–176 |
| After 3 days | (¹) | Exploded |
| Screen Analysis: | | |
| 8 on 10 mesh, percent | 21 | 24 |
| 10 on 28 mesh, percent | 37 | 37 |
| 28 on 65 mesh, percent | 5 | 4 |
| −65 mesh, percent | 37 | 35 |
| −325 mesh, percent | 31 | 29 |

¹ No explosion, 2 tests.

In one respect my invention relates to monliths in which dead burned magnesite is a preponderant constituent (or at least 40 and preferably over 50%, by weight). Other basic materials such as olivine, chrome ore, and forsterite can be mixed with the magnesite to constitute the remaining 60% or less of the total mix. These materials should be in the coarser or −3 +28 mesh range (some can be as coarse as ¼″, i.e., up to about 5%, by weight) because 30 to 50% of the mix must be fine magnesite.

The typical chemical analyses for the magnesites used in the exemplary mixes are contained in the following table.

TABLE III

| | Percent | | | |
|---|---|---|---|---|
| Magnesite | A | B | C | D |
| $SiO_2$ | 2.8 | 1.5 | 1.4 | 2.5 |
| $Al_2O_3$ | 0.3 | 0.3 | 0.3 | 0.5 |
| $Fe_2O_3$ | 0.6 | 3.6 | 1.0 | 0.4 |
| CaO | 1.5 | 4.4 | 4.5 | 1.0 |
| MgO | 94.8 | 90.2 | 93.1 | 95.2 |
| $Cr_2O_3$ | | | | 0.4 |

It should be understood that this invention broadly pertains to dead burned magnesite castables having an oxysulfate bond. It is not intended to be limited to the specific sulfate salts disclosed. Furthermore, it is not intended that borate additions be limited to those specifically disclosed. Other water soluble boron compounds can be used.

Having thus described the invention in detail and with sufficient particularity as to enable those skilled in the art to practice it, what is desired to have protected by Letters Patent is set forth in the following claims.

We claim:

1. A basic refractory castable made from a batch comprising basic refractory aggregates, said batch having a coarse (+65 mesh) and a fine (−65 mesh) fraction, said −65 mesh fraction consisting essentially of dead burned magnesite and 1 to 5%, by weight of the batch, of a binder selected from the group consisting of nitre cake and magnesium sulfate, ½ to 2%, by weight, boric acid and 1 to 5%, by weight, pigment grade chromic oxide.

2. A castable according to claim 1 in which the binder consists typically of 2% nitre cake, ½% boric acid and 1% chromic oxide.

3. A castable according to claim 1 in which the size graded magnesite is at least 95% MgO, by weight on an oxide analysis.

4. A castable according to claim 1 in which the chromic oxide is substantially discrete particles having an average diameter of less than about 1 micron.

5. A castable according to claim 1 being size graded to have the following screen analysis:

Mesh:
- 3 on 28 _____ 40–60%.
- −65 _____ At least 35%.
- −325 _____ At least 25%.

6. A method of making monolith refractory furnace lining comprising the steps of:
   (1) forming a batch comprising size graded dead burned magnesite with a binder comprising nitre cake, boric acid and pigment grade chromic oxide,
   (2) tempering the batch with aqueous tempering fluid,
   (3) placing the batch in its situs of use, and
   (4) burning said emplacement, said emplacement being resistant to explosion during burn-in and being highly refractory.

References Cited
UNITED STATES PATENTS

| | | | |
|---|---|---|---|
| 3,192,058 | 6/1965 | Davies et al. | 106—59 |
| 3,279,933 | 10/1966 | Martinet | 106—59 |

JAMES E. POER, *Primary Examiner.*

U.S. Cl. X.R.

106—60